(12) United States Patent
Prim

(10) Patent No.: US 7,476,372 B2
(45) Date of Patent: Jan. 13, 2009

(54) FLUE GAS SCRUBBING PROCESS UTILIZING BIOSOLIDS

(75) Inventor: Eric Prim, Odessa, TX (US)

(73) Assignee: Holloman Corporation, Odessa, TX (US)

(*) Notice: Subject to any disclaimer, the term of this patent is extended or adjusted under 35 U.S.C. 154(b) by 304 days.

(21) Appl. No.: 11/427,277

(22) Filed: Jun. 28, 2006

(65) Prior Publication Data
US 2008/0003156 A1 Jan. 3, 2008

(51) Int. Cl.
B01D 53/40 (2006.01)
B01D 53/50 (2006.01)
B01D 53/56 (2006.01)
B01D 53/60 (2006.01)
B01D 53/62 (2006.01)
F23J 7/00 (2006.01)

(52) U.S. Cl. ............... 423/210; 423/242.1; 423/243.01; 423/243.08; 423/244.01; 423/244.07; 423/235; 423/220; 423/225; 423/230; 423/555; 431/2; 110/342; 110/344; 110/345; 110/346

(58) Field of Classification Search ................. 423/210, 423/242.1, 243.01, 243.08, 244.01, 244.07, 423/235, 220, 225, 230, 555; 431/2; 110/342, 110/344, 345, 346

See application file for complete search history.

(56) References Cited

U.S. PATENT DOCUMENTS

| | | | | |
|---|---|---|---|---|
| 3,348,914 A | * | 10/1967 | Trimbach et al. | ........... 423/405 |
| 3,974,783 A | * | 8/1976 | Flynn | ........... 44/603 |
| 4,102,277 A | * | 7/1978 | Wall | ........... 110/342 |
| 4,818,505 A | * | 4/1989 | Muller | ........... 423/210 |
| 4,844,721 A | * | 7/1989 | Cox et al. | ........... 95/154 |
| 5,817,282 A | * | 10/1998 | Radlein et al. | ........... 423/235 |
| 6,168,770 B1 | * | 1/2001 | Heed | ........... 423/235 |
| 6,214,064 B1 | | 4/2001 | Boss et al. | |
| 6,405,664 B1 | * | 6/2002 | Logan et al. | ........... 110/345 |
| 6,912,962 B2 | | 7/2005 | Morin et al. | |
| 7,004,089 B2 | | 2/2006 | Dernjatin et al. | |
| 2005/0066860 A1 | * | 3/2005 | Logan et al. | ........... 106/745 |
| 2005/0274307 A1 | * | 12/2005 | Lissianski et al. | ........... 110/345 |
| 2006/0014639 A1 | * | 1/2006 | Bandosz et al. | ........... 502/417 |
| 2007/0140943 A1 | * | 6/2007 | Comrie | ........... 423/242.1 |

* cited by examiner

Primary Examiner—Timothy C Vanoy
(74) Attorney, Agent, or Firm—Conley Rose, P.C.; Grant Rodolph

(57) ABSTRACT

A method for reducing acid gases in a flue gas, the method comprising reacting biosolids comprising a scrubbing agent with a flue gas comprising an acid gas, thereby reducing the amount of acid gas in the flue gas is disclosed. Also disclosed is a flue gas scrubbing process comprising: combusting a fossil fuel and biosolids comprising a scrubbing agent, thereby producing a flue gas comprising an acid gas, wherein the flue gas has a reduced amount of acid gas compared with flue gas produced from the combustion of the fossil filet alone. A flue gas scrubbing process comprising providing a stream of biosolids that includes a hydroxide or an oxide of a Group IA or IIA element, providing a flue gas comprising an acid gas, and reacting the biosolids stream with the flue gas so as to reduce the amount of acid gas in the flue gas is also disclosed.

18 Claims, 2 Drawing Sheets

FLUE GAS SCRUBBING PROCESS UTILIZING BIOSOLIDS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention generally relates to a process for treating a flue gas containing an acid gas. Specifically, the invention relates to a method for using biosolids to reduce the acid gas content of the flue gas.

BACKGROUND

One of the most popular forms of power generation is the combustion of fossil fuels, such as natural gas and coal. In industrial settings, the mixture of gases produced by the combustion of fossil fuels is known as a flue gas. While the flue gas generally contains relatively inert components such as ash and water, the flue gas also contains several undesirable components including acid gases. Acid gases are vapor phase chemical compounds that form acids when exposed to moisture. The presence of acid gases in the flue gas is generally not preferred because the acid gases contribute to several undesirable atmospheric phenomena, including acid rain and global warming. The United States and several other national governments have sought to reduce the occurrence of these undesirable atmospheric phenomena by limiting the amount of acid gases that power plants and other industrial complexes are allowed to emit into the atmosphere. As such, there is an ongoing need to reduce acid gas emissions from industrial plants, such as power plants.

Various techniques have been developed for removing acid gases from flue gas. Generally, these techniques involve passing the flue gases through carbon scrubbers or filters that absorb or adsorb at least some of the acid gases. Alternatively, the acid gases can be scrubbed with caustic solutions that reduce the amount of acid gases present in the flue gas. However, the existing methods for reducing acid gas emissions are problematic in that they are relatively inefficient, expensive, and/or time consuming. Consequently, a need exists for an improved method to reduce the acid gases present in the flue gas.

SUMMARY OF THE INVENTION

In one aspect, the invention includes a method for reducing acid gases in a flue gas, the method comprising: reacting biosolids comprising a scrubbing agent with a flue gas comprising an acid gas, thereby reducing the amount of acid gas in the flue gas. In embodiments, the acid gas is $SO_x$, $NO_x$, or $CO_x$, and/or the scrubbing agent is a hydroxide or an oxide of a Group IA or IIA element. In other embodiments, the reacting step comprises mass transfer between the flue gas and the biosolids, or combustion of the biosolids and a fossil fuel. The reacting step may consume the biosolids, thereby generating heat. Alternatively, the reacting step reduces the pH of the biosolids.

In another aspect, the invention includes a flue gas scrubbing process comprising: combusting a fossil fuel and biosolids comprising a scrubbing agent, thereby producing a flue gas comprising an acid gas, wherein the flue gas has a reduced amount of acid gas compared with flue gas produced from the combustion of the fossil fuel alone. In one embodiment, the biosolids have an energy density of at least about 5,000 Btu/lb. In another embodiment, the combusting step yields gypsum. The biosolids may comprise from about 50 percent to about 70 percent organics and from about 30 percent to about 50 percent of the scrubbing agent. Variously, the scrubbing agent is calcium hydroxide and/or the fossil fuel is coal. The combusting step occurs in a fluidized bed reactor.

In a third aspect, the invention includes a flue gas scrubbing process comprising providing a stream of biosolids that includes a hydroxide or an oxide of a Group IA or IIA element, providing a flue gas comprising an acid gas, and reacting the biosolids stream with the flue gas so as to reduce the amount of acid gas in the flue gas. The process may further comprise: dewatering the slurry and/or removing the metals from the flue gas. In an embodiment, the reacting step increases the nutrient value of the biosolids. In another embodiment, the reacting step reduces the pH of the biosolids. The invention includes biosolids resulting from the aforementioned process.

DETAILED DESCRIPTION OF THE PREFERRED EMBODIMENTS

Disclosed herein is a flue gas scrubbing process that utilizes biosolids to reduce the amount of acid gases in the flue gas. Specifically, the biosolids contain a scrubbing agent that reacts with the acid gases, causing the acid gases to form compounds that do not form acid when exposed to moisture. The reaction between the scrubbing agent and the acid gases described herein has various embodiments, including a combustion reaction that consumes the biosolids, and a mass-transfer reaction that preserves the biosolids. Each of these embodiments is described in greater detail below.

Figure 1:
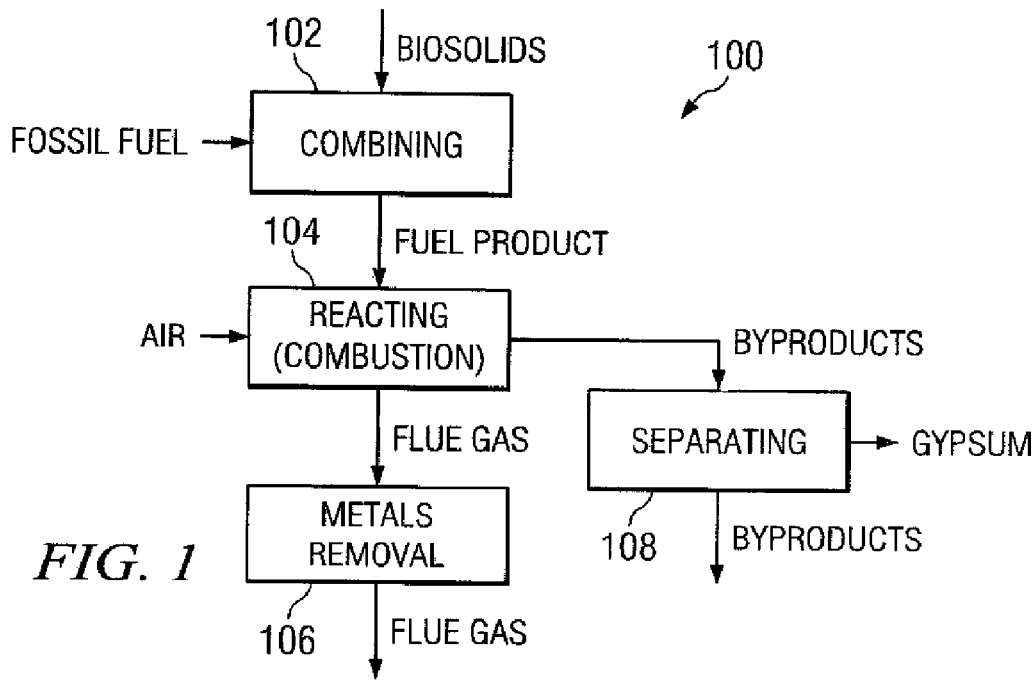
FIG. 1 is a flowchart of one embodiment of the present flue gas scrubbing process.

FIG. 1 illustrates the combustion embodiment 100 of the flue gas scrubbing process. Generally, the combustion embodiment 100 comprises the steps of: combining the biosolids and a fossil fuel to form a fuel product at 102, combusting the fuel product to produce a flue gas and byproducts at 104, and removing metals from the flue gas at 106. The combustion of the fuel product at 104 may yield gypsum, in which case the gypsum may be removed from the byproducts at 108. Each of these steps is described in greater detail below.

Various types of fossil fuels may be used with the flue gas scrubbing process described herein. Generally, fossil fuels include any hydrocarbon compound or hydrocarbon derivative, including, natural gas, oil, coal, asphalt, coke, alkenes, alkanes, and combinations thereof. In the context of power generation, the fossil fuels typically are coal, natural gas, or combinations thereof and are burned to turn water into steam, which is then used to generate electricity. However, the flue gas described herein may result from the combustion of fossil fuels in any industrial or commercial setting and is not limited to power generation.

The flue gas is any exhaust or gas mixture that contains acid gases. Specifically, the term "flue gas" as it is used herein includes the reaction products produced by the combustion of fossil fuels, as well as any air or liquid that contains acid gases. The term "acid gas" as it is used herein includes those compounds that form acids when exposed to moisture or otherwise have a deleterious effect on the atmosphere and/or nature. Examples of acid gases include $CO_x$ such as CO and $CO_2$, $SO_x$ such as $SO_2$, $NO_x$, such as NO, $NO_2$ and $N_2O$. The flue gas may be produced by the combustion of the fossil fuels described herein, or by various other chemical processes known to persons of ordinary skill in the art.

Biosolids are a combination of biological solids and liquids that have been sanitized to substantially reduce the pathogens therein. The biosolids generally originate from municipal, industrial, and agricultural sludges as well as wastewater and sewage treatment plants. The biosolids are subsequently sanitized using heat, chemical treatment, or other methods. An example of a method for producing biosolids is described in U.S. patent application Ser. No. 11/421,179 filed May 31, 2006, now abandoned incorporated herein by reference as if reproduced in its entirety. The biosolids are preferably but not necessarily substantially pathogen-free and vector-free and may be EPA Class A, Class B, or other classes as specified by the regulations. While the composition of the biosolids may vary widely, in some embodiments the biosolids contain at least about 20 percent solids, from about 25 percent to about 95 percent solids, or from about 30 percent to about 50 percent solids. The biosolids may also have a pH of at least about 10, from about 11 to about 13, or about 12.

In an embodiment, the biosolids comprise the scrubbing agent. The scrubbing agent is a chemical compound that substantially reduces or eliminates the presence of acid gases in the flue gas. While the scrubbing agent may be added to the biosolids, in an embodiment the scrubbing agent is a remnant of the sanitizing process used to produce the biosolids such that no additional scrubbing agent has to be added to the biosolids to render the biosolids suitable for the flue gas scrubbing process described herein. In embodiments, the scrubbing agent is an oxide, hydroxide, or carbonate of a Group IA or IIA element. In other embodiments, the scrubbing agent is an oxide, a hydroxide, or a carbonate of a transition metal. Specific examples of scrubbing agents include lime, calcium hydroxide, calcium oxide, calcium carbonate, potassium hydroxide, potassium carbonate, magnesium hydroxide, and combinations thereof. In embodiments, the biosolids contain from about 1 percent to about 99 percent, from about 20 percent to about 60 percent, or from about 30 percent to about 50 percent of the scrubbing agent.

In an embodiment the biosolids and the fossil fuel are combined together to form the fuel product per step 102 of combustion embodiment 100. The biosolids and the fossil fuel are typically stored in individual tanks or other suitable storage facilities and piped, pumped, metered, or otherwise transported to a mixer where the biosolids and the fossil fuel may be combined such that the fuel product becomes partially or completely homogenized. The mixer used to combine the biosolids and the fossil fuel may be a static mixer comprising of a plurality of baffles or a dynamic mixer comprising at least one moving agitator. Alternatively, the biosolids and the fossil fuel may be independently transported directly to the combustion reactor and combined upon entry into the combustion reactor.

In an embodiment, air may be added during the combustion of the fuel product. Generally, air comprises about 79 percent nitrogen, about 21 percent oxygen, and trace amounts of other components. When oxygen is present in sufficient amounts, it oxidizes monoxides such as carbon monoxide into dioxides such as carbon dioxide. In contrast with oxygen, nitrogen does not significantly affect the combustion reaction. In fact, when nitrogen is present in the combustion reaction, it may produce undesirable acid gases, such as $NO_x$. Thus, it is within the scope of the invention that the air may be separated into an oxygen-rich stream and a nitrogen-rich stream, and the oxygen-rich stream be added to the reactor during the combustion of the fuel product. Such a configuration improves the quality of the combustion and limits the amount of $NO_x$ gases produced. However, persons of ordinary skill in the art will appreciate that the cost of separating air into oxygen-rich and nitrogen-rich streams can be significant and may be unnecessary when implementing the flue gas scrubbing process described herein.

In an embodiment, the scrubbing agent in the fuel product reacts with the acid gases in the flue gas per 104 of combustion embodiment 100. Although the reaction step may be implemented as part of a batch process, generally the fuel product and the air are added to the reactor as part of a continuous process, e.g. wherein pre-existing quantities of the fuel product are already combusting in the reactor. As part of the combustion processes, the fossil fuel and the biosolids in the fuel product burn and produce energy in the form of heat. Without the inclusion of the scrubbing agent, the fossil fuel and biosolids would undergo normal combustion and produce the acid gases described herein. However, the inclusion of the scrubbing agent in the fuel product allows the scrubbing agent to react with the acid gases immediately upon their formation. While reaction chemistry for this process depends on the specific scrubbing agent, specific examples of the reaction chemistry are:

$$CaCO_3(solid)+SO_2(gas) \rightarrow CaSO_3(solid)+CO_2(gas) \quad \text{Equation 1:}$$

$$CaCO_3(solid)+NO_2(gas) \rightarrow CaNO_3(solid)+CO_2(gas) \quad \text{Equation 2:}$$

$$CaCO_3(solid)+CO_2(gas)+H_2O\,(liquid) \rightarrow Ca(HCO_3)_2 \,(liquid) \quad \text{Equation 3:}$$

$$Ca(OH)_2(solid)+SO_2(gas) \rightarrow CaSO_3(solid)+H_2O(liquid) \quad \text{Equation 4:}$$

$$Ca(OH)_2(solid)+NO_2(gas) \rightarrow CaNO_3(solid)+H_2O(liquid) \quad \text{Equation 5:}$$

$$Ca(OH)_2(solid)+CO_2(gas) \rightarrow CaCO_3(solid)+H_2O(liquid) \quad \text{Equation 6:}$$

$$CaO(solid)+SO_2(gas) \rightarrow CaSO_3(solid) \quad \text{Equation 7:}$$

$$CaO(solid)+NO_2(gas) \rightarrow CaNO_3(solid) \quad \text{Equation 8:}$$

$$CaO(solid)+CO_2(gas) \rightarrow CaCO_3(solid) \quad \text{Equation 9:}$$

There are several advantages to using hydroxides and oxides as the scrubbing agent. As can be seen from equations 1-9, it is preferable that the scrubbing agent be a hydroxide or an oxide rather than a carbonate because the carbonates produce carbon dioxide as a reaction product. However, carbonates should not be considered unsuitable for use as the scrubbing agent because carbon dioxide can be further reacted to form bicarbonate. Even if the carbon dioxide does not form bicarbonate, the carbon dioxide is generally preferable over sulfur dioxide, $NO_x$, and other acid gases in the flue gas because carbon dioxide is used by plants to generate oxygen. Another advantage of using hydroxides and oxides is that the reaction with the acid gases is more efficient. For example, all other conditions being equal, the reaction between sulfur dioxide and calcium hydroxide is about 35 percent more efficient than the reaction between sulfur dioxide and calcium carbonate. Thus, about 65 pounds of calcium hydroxide can be used to achieve the same levels of acid gas reduction as can be obtained with about 100 pounds of calcium carbonate. Such efficiency reduces the amount of scrubbing agent that is needed in the biosolids, which increases the energy density of the biosolids as explained in detail below.

In an embodiment, any metals present in the flue gas are removed per 106 of combustion embodiment 100. The metals removal is an optional step and may only be necessary when a chemical composition analysis of the flue gas determines that metals are present in the flue gas. The United States Environmental Protection Agency (EPA) and other governmental organizations regulate the amount of metals that may be emitted into the atmosphere; thus metals removal will be necessary when sufficient amounts of metals are present in the flue gas. Examples of these regulated metals include, lead, silver, copper, and zinc. The metals may be initially present in the biosolids or the fossil fuel, but can become entrained in the flue gas during the combusting step. Thus, while it is contemplated that the metals may be removed from the fossil fuel and/or biosolids prior to combustion, in an embodiment the metals are removed from the flue gas using an electrostatic precipitator or other metals removal device known to persons of ordinary skill in the art. The resulting metal-free flue gas can then be emitted to the atmosphere or further treated as desired.

When the fuel product is combusted at step 104, the solid reaction products that remain are referred to as byproducts. When the scrubbing agent is a calcium compound, the byproducts include calcium sulfite, ash, water, and gypsum. Specifically, if sufficient oxygen and water are present in the reactor during combustion, the calcium sulfite can be oxidized to produce gypsum according to the following reaction:

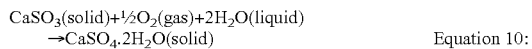

Equation 10:

Gypsum is a valuable compound that is used to manufacture drywall and other construction materials. Thus, the combustion embodiment 100 may further comprise the step of separating the gypsum from the other byproducts at 108. While the specific separation method will depend on the specific composition of the byproducts, examples of suitable gypsum separation methods include sorting, screening, centrifuging, phase change, filtration, electrostatic separation, and selective floatation. Persons of ordinary skill in the art are aware of other methods for separating gypsum from the remaining byproducts.

One advantage of the combustion embodiment 100 is that it removes more acid gases from the flue gas than existing scrubbing processes. Provided that sufficient oxygen and/or water are present in the reactor, the scrubbing agents will precipitate substantially all of the acid gases from the flue gas. When insufficient amounts of oxygen and/or water are present, the use of carbonates as the scrubbing agent substantially reduces the presence of several acid gases, but has the less desirable side effect of producing carbon dioxide. Thus, in such instances, it may be more preferable to use hydroxides and oxides as the scrubbing agent such that the production of carbon dioxide is substantially reduced or eliminated. In either case, the flue gas resulting from the flue gas scrubbing process described herein is comprised mainly of water, particulates, and various inert compounds.

Another advantage of the use of biosolids in the combustion embodiment 100 is that the biosolids have a significant energy density such that they do not substantially reduce the energy output of the combustion reaction. In their pure form, the organic portion of the biosolids has an energy density between about 8,000 Btu/lb and about 10,000 Btu/lb. By comparison, coal has an energy density of between 9,000 Btu/lb and 18,000 Btu/lb. However, the inclusion of the scrubbing agent in the biosolids may reduce the energy density of the biosolids. The change in energy density due to the inclusion of the scrubbing agent can be minimized by controlling the amount and/or type of scrubbing agent in the biosolids. In one embodiment in which the biosolids contain about 60 percent organics and about 40 percent of calcium hydroxide, the overall energy density of the biosolids is at least about 4,500 Btu/lb, at least about 5,000 Btu/lb, or at least about 5,500 Btu/lb. Thus, the inclusion of the biosolids in the combustion reaction does not significantly reduce the energy output of the combustion reaction. Energy densities of at least about 5,000 Btu/lb are particularly preferable in power generation settings because they allow the generation facility to claim an alternative energy credit from the United States and other governments.

Figure 2:
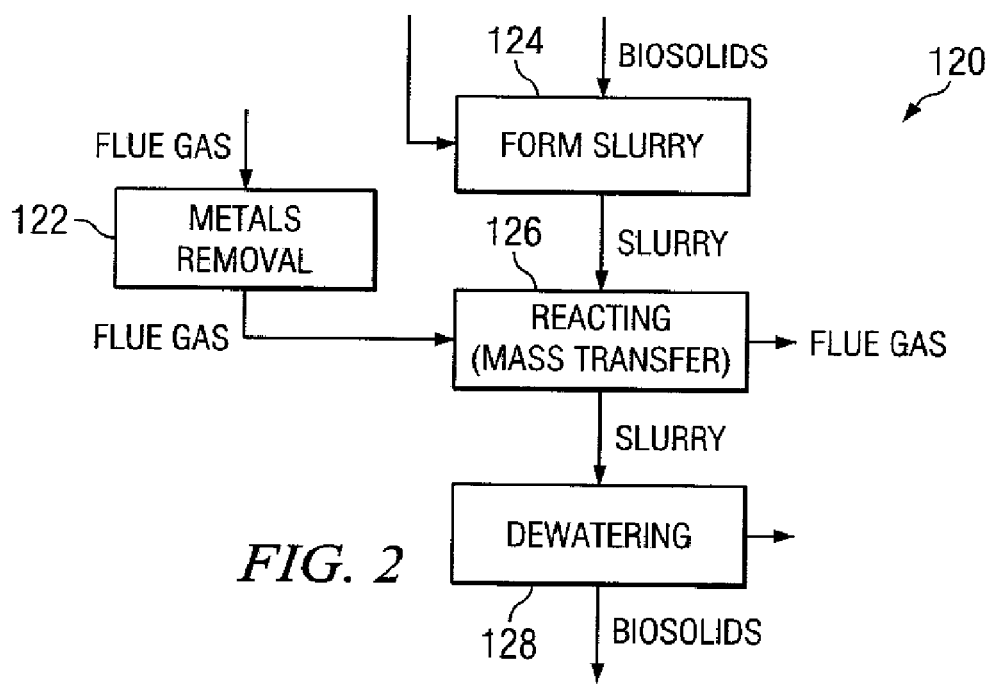
FIG. 2 is a flowchart of another embodiment of the present flue gas scrubbing process.

FIG. 2 illustrates the mass-transfer embodiment 120 of the flue gas scrubbing process. Generally, the mass-transfer embodiment 120 comprises the steps of: preparing a slurry of biosolids and water at 124, reacting the flue gas with the slurry at 126, and dewatering the slurry to produce biosolids at 128. In addition, the mass-transfer embodiment 120 may comprise removing metals from the flue gas at 122 prior to reacting the flue gas with the slurry at 126. Each of these steps is described in greater detail below.

In an embodiment, the biosolids are mixed with water to form a slurry per 124 of mass-transfer embodiment 120. The formation of the slurry is an optional step that is advantageous when water is added to the biosolids to increase the efficiency of reaction. The composition and physical properties of the biosolids are the same as described above and the water may be derived from any source, including groundwater, freshwater, and saltwater. Generally, the formation of the slurry comprises mixing the appropriate amounts of water and biosolids in a mixer until the desired solids content is achieved. The biosolids and the water may be combined such that the slurry becomes partially or completely homogenized. The mixer used to combine the biosolids and the water may be a static mixer including a plurality of baffles, a dynamic mixer including at least one moving agitator, or any other suitable mixing device. In embodiments, the slurry contains from about 1 percent to about 99 percent, from about 5 percent to about 50 percent, or from about 10 percent to about 30 percent of the solids.

Much like the metals removal step 106 in the combustion embodiment 100, in an embodiment any metals present in the flue gas are removed per 122 of mass-transfer embodiment 120. As discussed above, the metals content of flue gases are heavily regulated, so it is preferable that the metals be removed from the flue gas prior to emission to the atmosphere. Thus, in an embodiment the metals are removed from the flue gas using an electrostatic precipitator or other metals removal device known to persons of ordinary skill in the art. The metals removal can occur prior to reaction with the biosolids slurry, or subsequent to reaction with the biosolids slurry. Metals removal subsequent to the reaction with the biosolids slurry is advantageous when it is desirable to transfer some of the metals, e.g. iron or zinc, to the biosolids slurry. Metals removal prior to the reaction with the biosolids slurry is advantageous because it prevents the metals from being transferred to the biosolids, where the metals content is also regulated. The resulting metal-free flue gas can then be reacted with the biosolids slurry per 126 of the mass-transfer embodiment 120.

In an embodiment, the scrubbing agent in the slurry reacts with the acid gases in the flue gas per 126 of mass transfer embodiment 120. Although the reaction may be implemented as part of a batch process, generally the slurry and the flue gas are added to a reactor as part of a continuous process. In contrast with the combustion reactor described above, the reactor used in the mass-transfer embodiment 120 is generally a mass-transfer column. Briefly, the mass-transfer column creates an abundance of surface area between the slurry and the flue gas so that the scrubbing agent can react with the acid gases in the flue gas. The reaction chemistry between the scrubbing agent and the acid gases is substantially the same as equations 1-9. However, unlike the combustion embodiment 100 described above, the mass-transfer embodiment 120 does not consume or destroy the biosolids as part of the reaction. Rather, the acid gases are transformed into nutrients, such as calcium sulfite, that are present in the biosolids. After reacting with the slurry, the acid gas content of the resulting flue gas is substantially reduced or eliminated, and thus the resulting flue gas can be emitted into the atmosphere or otherwise processed as desired.

In an embodiment, the biosolids may undergo an optional dewatering step per 128 of mass-transfer embodiment 120. The dewatering step allows the amount of water in the biosolids to be adjusted after reacting with the flue gas. Several dewatering processes are known by persons of ordinary skill in the art including heating or otherwise drying the biosolids to evaporate some of the water therein. Alternatively, the biosolids can be filtered to separate the desired amount of water from the remaining water and solids. Further in the alternative, the biosolids can be exposed to a chemical drying agent that removes some of the water from the biosolids. In embodiments, the dewatered biosolids may contain at least about 50 percent solids, from about 70 percent to about 90 percent solids, or from about 75 percent to about 85 percent solids.

One advantage of the mass-transfer embodiment 120 is that it decreases the pH of the biosolids. Generally, when biosolids are sanitized to substantially reduce the pathogens therein, the pH of the biosolids is raised to a level that renders the biosolids unsuitable for most practical applications, e.g. as a fertilizer. For example, these biosolids may have a pH of at least about 10, from about 11 to about 13, or about 12. When the biosolids react with the acid gases present in the flue gas, the acid gases reduce the pH of the biosolids to a more neutral level. In embodiments, the mass transfer embodiment 120 decreases the pH of the biosolids to no more than 10, from about 5 to about 9, or from about 6 to about 8.

Another advantage of the mass-transfer embodiment 120 is that it adds nutrients to the biosolids. The reactions in equations 1-9 produce various nitrates, sulfates, and carbonates, which are important additives for fertilizers. The increased concentration of nitrates, sulfates, and carbonates increases the ability of the fertilizer to help plants grow, and thus increases the commercial value of the fertilizer. The specific amount of nitrates, sulfates, and carbonates in the fertilizer will depend on the type and amount of acid gases in the flue gas, the efficiency of the mass-transfer reactor, and the composition of the biosolids.

Figure 3:
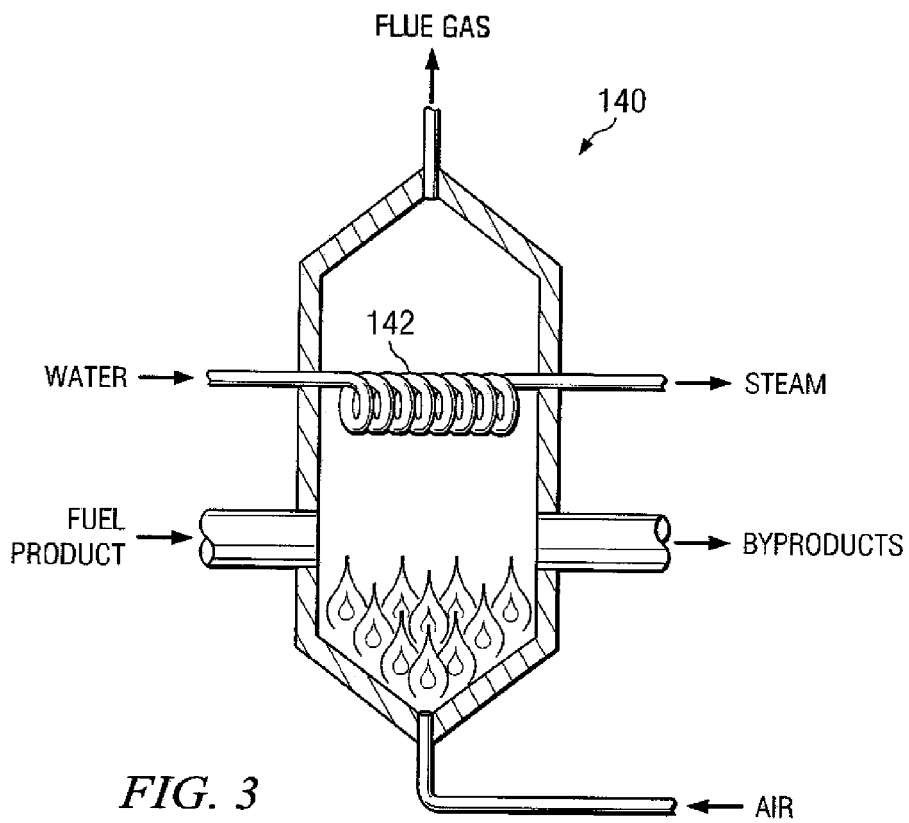
FIG. 3 is an example of a combustion reactor suitable for use in the present invention.

Various types of reactors can be used to implement the flue gas scrubbing process described herein. FIG. 3 is an example of a fluidized bed reactor 140 used to implement the combustion embodiment 100 of the flue gas scrubbing process. The space within the reactor 140 is sufficiently turbulent that the fuel product is fluidized by the lifting action caused by the air feed at the bottom of the reactor 140. The fluidization within the reactor 140 results in an increased reaction efficiency. The heat produced by the combustion reaction heats water that passes through a plurality of conduits 142 extending through the reactor 140, turning the water into steam that is then used to generate power using known processes, such as steam turbines. The combustion byproducts, which may include gypsum, are removed from the reactor 140 periodically or on a continuous basis. The flue gas produced by the combustion of biosolids and fossil fuels has significantly fewer acid gases than the flue gas produced by the combustion of fossil fuels in the absence of biosolids. The flue gas exiting the reactor 140 may be subjected to the aforementioned metals removal process prior to being emitted to the atmosphere.

Figure 4:
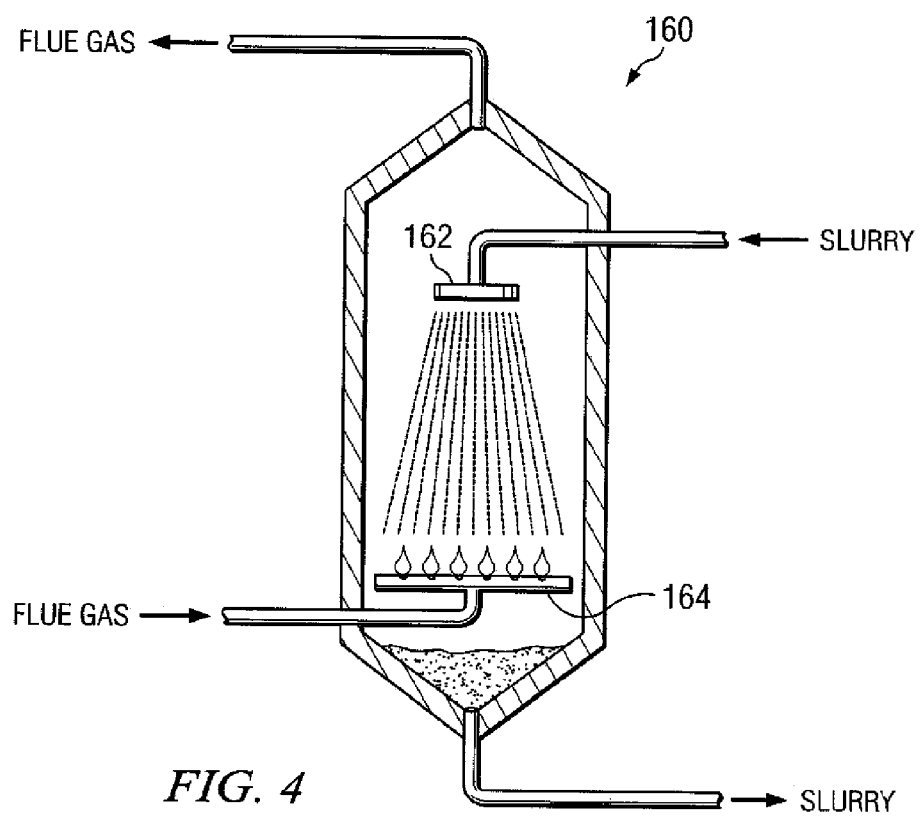
FIG. 4 is an example of a mass-transfer reactor suitable for use in the present invention.

FIG. 4 is an example of a spray tower reactor 160 that can be used to implement the mass-transfer embodiment 120 of the flue gas scrubbing process. Briefly, the reactor 160 comprises a spray head 162 that sprays the biosolids slurry at the top of the reactor 160, and a distributor 164 that distributes the flue gas at the bottom of the reactor 160. The reactor 160 is generally configured for concurrent flow such that the biosolids slurry travels down the reactor 160 and exits the bottom of the reactor 160, while the flue gas travels up the reactor 160 and exits the top of the reactor 160. The combination of the spray head 162 and the distributor 164 creates an abundance of surface area between the liquid phase slurry and the vapor phase flue gas, which improves the efficiency of the reaction between the scrubbing agent and the acid gases. The flue gas may be subjected to the aforementioned metals removal process prior to entering the reactor 140 so that the flue gas and the biosolids slurry exiting the reactor 160 are both substantially free of metals.

Various other types of reactors may be used with the flue gas scrubbing process described herein. If the combustion embodiment 100 is employed, then the reactor may be any type of combustion reactor, such as a conventional combustion chamber or a boiler. If the mass-transfer embodiment 120 is employed, then the reactor may be any type of mass-transfer column, such as a packed tower, a bubble tower, a venturi tower, a bubble tower, or a plate tower. In either case, the reactor can be a plug flow reactor or a stirred tank reactor. Persons of ordinary skill in the art are aware of other types of reactors that can be used to implement the flue gas scrubbing process described herein.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Specifically, while the process is described in terms of a continuous process, it is contemplated that the process can be implemented as a batch process. In addition, where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference in the herein is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method comprising:
   burning biosolids comprising a scrubbing agent in the presence of a flue gas comprising an acid gas, thereby reducing the amount of acid gas in the flue gas,
   wherein the scrubbing agent is a hydroxide of a Group IA element, a Group IIA element, a transition metal, or combinations thereof.

2. The process of claim 1 wherein the acid gas is $SO_x$, $NO_x$, $CO_x$, or combinations thereof.

3. The method of claim 1, wherein the biosolids have been treated pursuant to 40 C.F.R. Part 503 prior to burning.

4. The method of claim 1, wherein the scrubbing agent is a remnant of the sanitizing process used to produce the biosolids.

5. The method of claim 4, wherein no additional scrubbing agent is added to the biosolids after the biosolids are sanitized.

6. The method of claim 1 further comprising: removing any metals from the flue gas.

7. The method of claim 1, wherein the scrubbing agent reacts with the acid gas, and wherein the reaction is exothermic.

8. The method of claim 1, wherein the reaction produces a sulfite, a carbonate, a nitrate, or combinations thereof.

9. The method of claim 1, wherein the scrubbing agent and the acid gas are present in about stoichiometric equal amounts.

10. The method of claim 1, wherein the burning substantially eliminates the presence of the acid gas in the flue gas.

11. The method of claim 1, wherein the scrubbing agent comprises calcium hydroxide.

12. A flue gas scrubbing process comprising:
    combusting a fossil fuel and biosolids comprising a scrubbing agent, thereby producing a flue gas comprising an acid gas;
    wherein the flue gas has a reduced amount of acid gas compared with flue gas produced from the combustion of the fossil fuel alone, and
    wherein the biosolids comprise from about 50 percent to about 70 percent organics and from about 30 percent to about 50 percent scrubbing agent.

13. The process of claim 12 wherein the biosolids have an energy density of at least about 5,000 Btu/lb.

14. The process of claim 12 wherein the combusting step yields gypsum.

15. The process of claim 12 wherein the scrubbing agent comprises calcium hydroxide.

16. The process of claim 12 wherein the fossil fuel is coal.

17. The process of claim 12 wherein the combusting step occurs in a fluidized bed reactor.

18. The process of claim 12, wherein the combustion produces a sulfite, a carbonate, a nitrate, or combinations thereof.

* * * * *

UNITED STATES PATENT AND TRADEMARK OFFICE
CERTIFICATE OF CORRECTION

PATENT NO.        : 7,476,372 B2
APPLICATION NO.   : 11/427277
DATED             : January 13, 2009
INVENTOR(S)       : Eric Prim Page 1 of 1

It is certified that error appears in the above-identified patent and that said Letters Patent is hereby corrected as shown below:

Title page, item [57] Abstract, line 9, replace [filet] with -- fuel --.

Signed and Sealed this

Tenth Day of March, 2009

JOHN DOLL
*Acting Director of the United States Patent and Trademark Office*